United States Patent [19]
Hammer et al.

[11] Patent Number: 6,118,217
[45] Date of Patent: Sep. 12, 2000

[54] ADDITIONAL ELECTRODE FOR THREE-LEVEL OUTPUT AND IMPROVED STARTING OF COMPACT FLUORESCENT LAMP SYSTEMS

[75] Inventors: Edward E. Hammer, Mayfield Village; Michael M. Minarczyk, Brecksville, both of Ohio

[73] Assignee: General Electric Company, Schenectady, N.Y.

[21] Appl. No.: 09/265,197

[22] Filed: Mar. 10, 1999

[51] Int. Cl.[7] ........................................................ H01J 7/44
[52] U.S. Cl. .................. 315/58; 315/59; 313/306
[58] Field of Search .................. 315/58, 59, 60, 315/DIG. 4, DIG. 1, DIG. 2; 313/243, 245, 306

[56] References Cited

U.S. PATENT DOCUMENTS

| | | | |
|---|---|---|---|
| 4,348,612 | 9/1982 | Morton | 315/58 |
| 4,450,510 | 5/1984 | Nilssen | 362/221 |
| 5,627,433 | 5/1997 | Fulop et al. | 315/58 |
| 5,821,699 | 10/1998 | Moisin | 315/DIG. 4 |
| 6,051,930 | 4/2000 | Hammer et al. | 315/58 |

*Primary Examiner*—Don Wong
*Assistant Examiner*—Thuy Vinh Tran
*Attorney, Agent, or Firm*—Fay, Sharpe, Fagan, Minnich & McKee, LLP

[57] ABSTRACT

A sealed lamp unit for a three-way fluorescent lamp system comprises first and second lamp electrodes located at respective end points of, and extending into, the sealed lamp unit. The sealed lamp unit comprises at least one gas, which breaks-down when an electrical voltage potential is created within the sealed lamp unit. A third lamp electrode is located between the first and second lamp electrodes and extends into the sealed lamp unit. A brightness level of light output from the sealed lamp unit is a function of energizing selected electrodes. A color of the light is independent of the brightness level. A first extended wire connection is electrically connected between the first and second lamp electrodes. A first capacitive impedance, electrically connected in series along the first extended wire connection, limits a current flow through the first extended wire connection. A breakdown voltage path within the sealed lamp unit is modified as a function of a position of the third lamp electrode.

19 Claims, 3 Drawing Sheets

ADDITIONAL ELECTRODE FOR THREE-LEVEL OUTPUT AND IMPROVED STARTING OF COMPACT FLUORESCENT LAMP SYSTEMS

BACKGROUND OF THE INVENTION

The present invention relates to compact fluorescent lamp ("CFL") systems. It finds particular application in conjunction with controlling a light intensity output from CFL systems and will be described with particular reference thereto. It will be appreciated, however, that the present invention is also amenable to other like applications.

Fluorescent lamps have many advantages as compared to other known types of lamps. Such advantages include high luminous efficiency and relatively simple operating conditions. Although known CFL's facilitate providing the advantages of fluorescent lighting in previous incandescent lighting applications, such CFL's have not satisfied the requirements of all incandescent lighting applications. For example, some known incandescent lamps provide three-way lighting selection. Although some conventional CFL systems are capable of providing three (3) levels of brightness, the light produced at the various brightness levels has different colors.

In other words, the color of the light output by a conventional three (3) level CFL shifts when the brightness level of the CFL system is changed.

Many compact fluorescent lamp systems include a sealed, gas-filled lamp having multiple fingers. A gas filling of Argon at approximately 3 Torr coupled with a sufficient quantity of mercury, for example, is commonly used. An inner wall of the lamp is coated with a material (e.g., a mixture of phosphors) which fluoresces when it is bombarded by ultraviolet radiation generated when the mercury within the lamp is ionized. The fingers of a compact fluorescent lamp are typically formed from several U-shaped tubes. Bridges (i.e., passageways) connect all but two (2) ends of adjacent tubes, thereby forming a lamp having a hexagonal or octagonal geometry. Lamp electrodes are sealed into the unconnected adjacent ends. Conducting electrodes from a high-frequency (e.g., greater than 20 kHz) ballast unit are secured to the lamp electrodes.

When a starting voltage is delivered from the ballast unit to the conducting electrodes, that voltage is transferred to the interior of the lamp via the lamp electrodes. The starting voltage creates electromagnetic fields within the lamp which create a breakdown voltage path and a current within the tubes.

The voltage potential within the tubes breaks-down (i.e., ionizes) the inert gas and mercury. Once the mercury atoms are ionized, and a threshold number of ions are produced, the lamp will start and the coating material within the lamp begins to fluoresce.

In its initial state, the inert gas within the lamp presents a high impedance to the ballast. Therefore, the starting voltage supplied by the ballast must be high enough to overcome this impedance and create an ionized gas capable of supplying the necessary current to operate the lamp. Supplying a starting voltage capable of ionizing enough gas to start the lamp, however, can produce an undesirable side-effect. More specifically, if the two (2) lamp electrodes are in close proximity to one another, a higher starting voltage may be necessary due to a capacitive breakdown path between the tubes including the lamp electrodes. When this occurs, not enough discharge current travels within the lamp tubes to start the lamp.

The present invention provides a new and improved CFL system which overcomes the above-referenced problems and others.

SUMMARY OF THE INVENTION

A starting circuit for a three-way fluorescent lamp system includes a ballast unit, for controlling electrical power received from an external power source, a sealed lamp unit, including at least one gas, and three lamp electrodes. The sealed lamp unit is secured to the ballast unit. The first and second lamp electrodes are located at respective end points of the sealed lamp unit. A third lamp electrode is located between the first and second lamp electrodes along the sealed lamp unit. The lamp electrodes extend into the sealed lamp unit and are electrically connected to the ballast unit. Two of the three lamp electrodes are selectively energized for achieving a desired light output level. A color of the light output is independent of the output level. A breakdown voltage path within the sealed lamp unit is modified as a function of a position of the third lamp electrode. A first extended wire connection is electrically connected between the first and third lamp electrodes. A first capacitor is electrically connected along the first extended wire connection.

In accordance with one aspect of the invention, the third lamp electrode divides the sealed lamp unit into first and second sections having unequal lengths.

In accordance with another aspect of the invention, a highest brightness level is achieved when the first and second lamp electrodes are energized. Similarly, a lowest brightness level is achieved when the first and third lamp electrodes are energized, and an intermediate brightness level is achieved when the second and third lamp electrodes are energized.

In accordance with another aspect of the invention, the lowest and intermediate brightness levels are functions of the respective lengths of the first and second sections.

One advantage of the present invention is that the benefits of fluorescent lighting are coupled with the convenience of three-way operation.

Another advantage of the present invention is that a substantially uniform color of light produced at the various brightness levels.

Another advantage of the present invention is that the breakdown voltage potential is distributed more evenly across the lamp, thereby reducing the voltage requirement to actually start the lamp.

Another advantage of the present invention is that a lower voltage is required to start the fluorescent lamp system.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
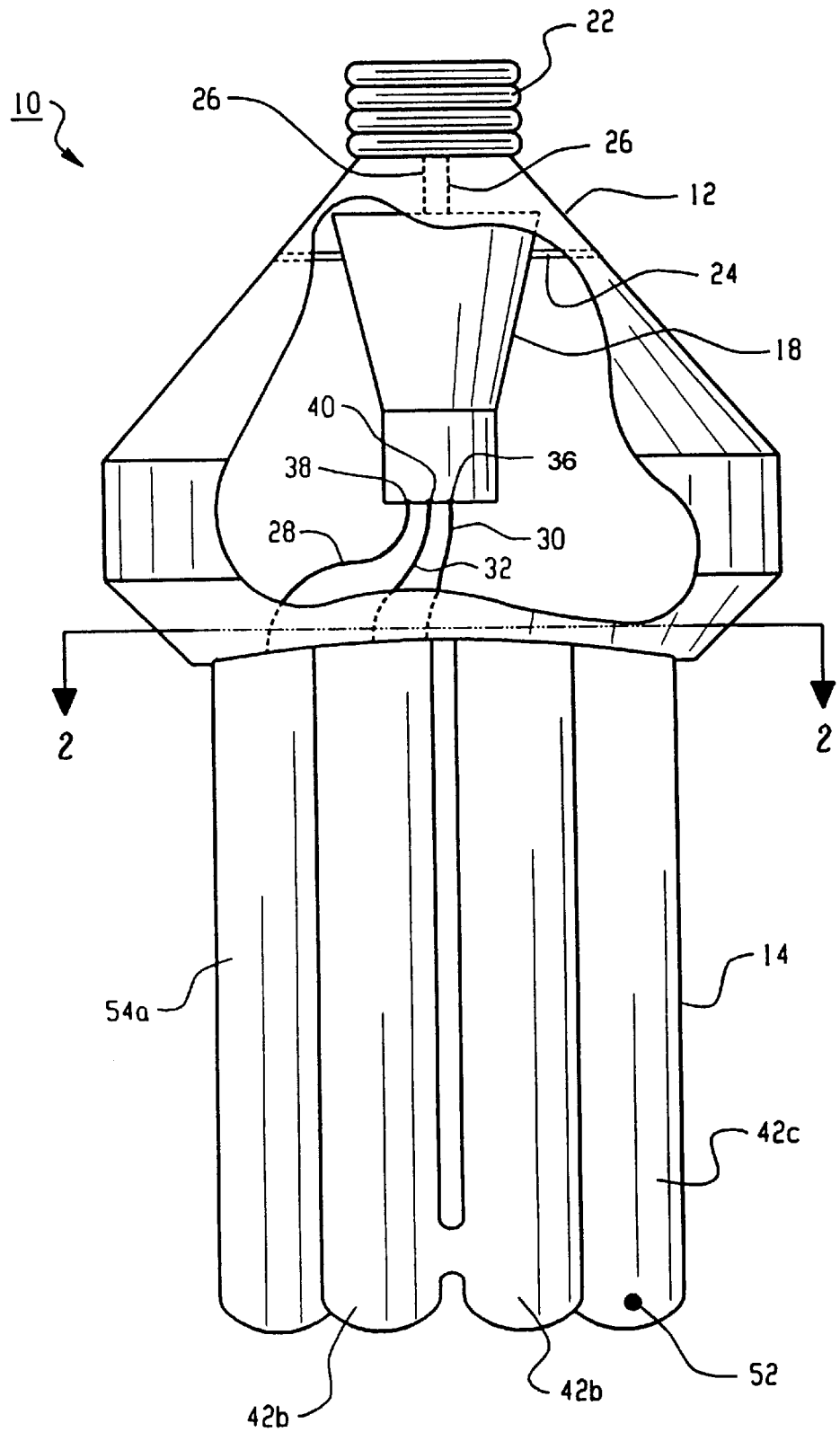
FIG. 1 illustrates a front view of an integral CFL system according to the present invention.

FIG. 1 illustrates an integral compact fluorescent lamp system 10. The compact fluorescent lamp system 10 includes a housing 12 and an integral type lamp assembly 14. The housing 12 includes a ballast unit 18 and a connection base 22. Fasteners 24 secure the ballast unit 18 to the housing 12. Preferably, the ballast unit 18 is a high-frequency, electronic ballast unit and the fasteners 24 include plastic segments which protrude from the walls of the housing 12 and attach to the ballast unit 18. However, it is to be understood that other ballast units and other types of fasteners are also contemplated. The connection base 22 is preferably an Edison base as used in threaded incandescent sockets. However, it is also contemplated that the connection base be a pin base, as used in a linear fluorescent lamp, or a bayonet-type base. Electrically conductive wires 26 provide an electrical connection between the connection base 22 and the ballast unit 18.

Figure 2:
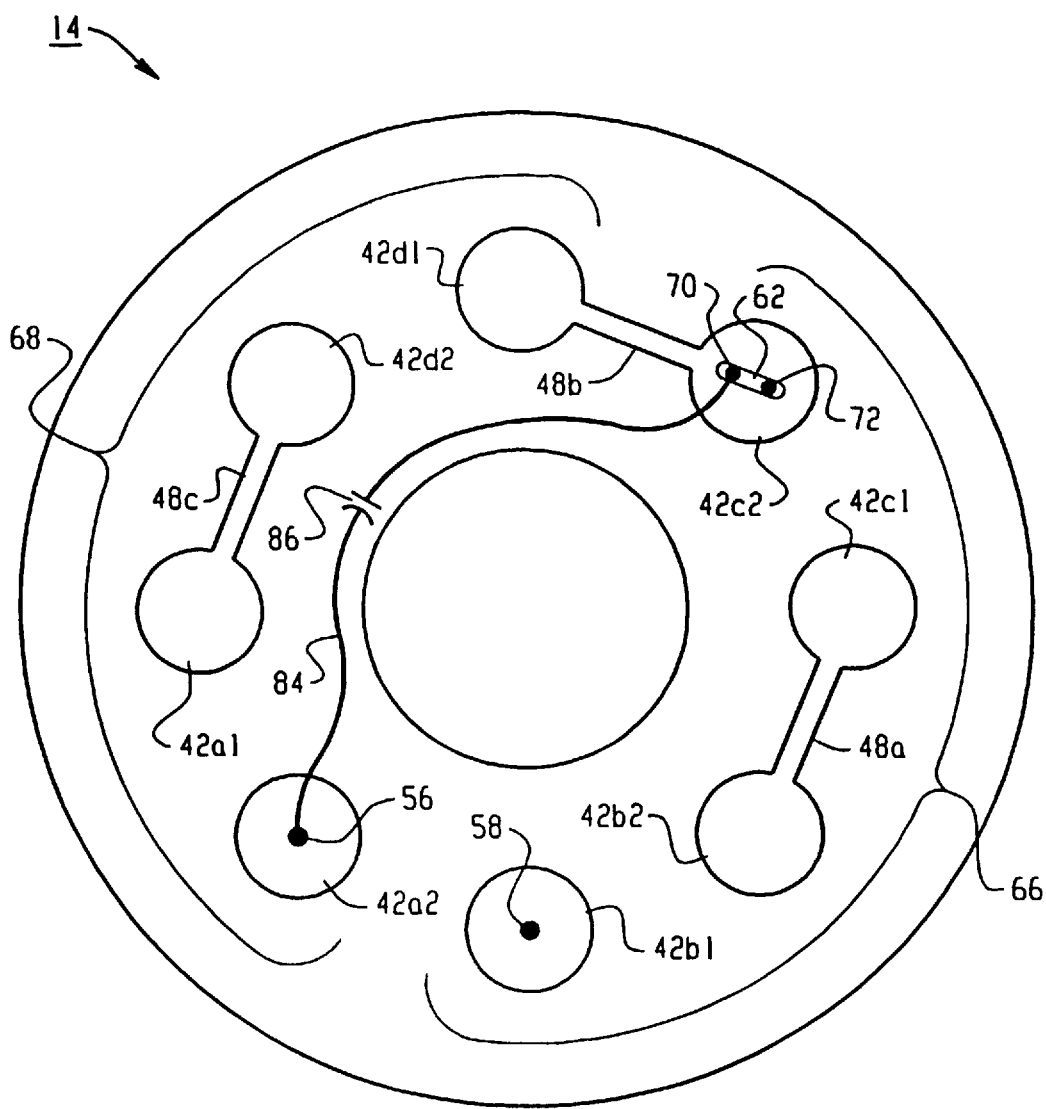
FIG. 2 illustrates a cross-sectional bottom view of the integral CFL assembly taken along the line indicated in FIG. 1.

With reference to FIGS. 1 and 2, the lamp assembly 14 is electrically connected to the ballast unit 18 through first, second, and third electrical connectors 28, 30, 32, respectively, in the housing 12. More specifically, the first electrical connector 28 connects a first electrode 36 of the ballast unit 18 to the lamp assembly 14. Similarly, the second and third electrical connectors 30, 32, respectively, connect second and third electrodes 38, 40, respectively, of the ballast unit 18 to the lamp assembly 14.

The lamp assembly 14 in the preferred embodiment includes four lamp tubes 42a, 42b, 42c, 42d. Each tube 42a, 42b, 42c, 42d is preferably bent into a U-shape. However, other embodiments having different numbers of tubes and/or tubes configured into different shapes are also contemplated. The lamp tube 42a includes tube ends 42a1, 42a2. Similarly, the lamp tubes 42b, 42c, 42d include tube ends 42b1, 42b2; 42c1, 42c2; and 42d1, 42d2, respectively.

The adjacent ends 42b2, 42c1; 42c2, 42d1; and 42d2, 42a1 of the lamp tubes 42a, 42b, 42c, 42d are connected by bridges (i.e., passageways) 48a, 48b, 48c, respectively. More specifically, a bridge (i.e., passageway) 48a connects the adjacent ends 42b2, 42c1 of lamp tubes 42b, 42c, respectively. Similarly, a bridge 48b connects the adjacent ends 42c2, 42d1 of lamp tubes 42c, 42d, respectively, and a bridge 48c connects the adjacent ends 42d2, 42a1 of lamp tubes 42d, 42a, respectively. The adjacent tube ends 42a2, 42b1, which are not connected by a bridge, are sealed. One of the tubes 42c optionally includes an amalgam ball pellet 52.

An inert gas with a sufficient quantity of mercury is included within the sealed tubes 42a, 42b, 42c, 42d and bridges 48a, 48b, 48c. Also, the inner wall of each tube 42a, 42b, 42c, 42d is coated with a material (e.g., a mixture of phosphors), which fluoresces when it is excited with ultraviolet radiation produced when the mercury atoms within the lamp assembly 14 are ionized.

A first lamp electrode 56, electrically connected to the first ballast electrode 36, extends into the sealed end 42a2. A second lamp electrode 58, electrically connected to the second ballast electrode 38, extends into the sealed end 42b1. A third lamp electrode 62, electrically connected to the third ballast electrode 40, extends into the tube end 42c2.

If one of the tubes 42a, 42b, 42c, 42d includes the amalgam ball pellet 52, it is preferable to insert the third lamp electrode 62 into the tube including the pellet 52. Furthermore, it is preferable that the third lamp electrode 62 not be positioned approximately one-half of the distance along the path within the lamp assembly 14. More specifically, because the third lamp electrode 62 is positioned in the tube end 42c2, the third lamp electrode 62 divides the path within the lamp assembly 14 into two (2) segments (i.e., a first segment 66 and a second segment 68) having unequal lengths. For example, the first segment 66 includes the tube 42c, the passage 48a, and the tube 42b while the second segment 68 includes the passage 48b, the tube 42d, the passage 48c, and the tube 42a. The length of the path through the lamp assembly 14 of the first segment 66 is shorter than the length of the path of the second segment 68. The lowest and intermediate brightness levels of the lamp assembly 14 are determined as a function of the respective lengths of the first and second segments 66, 68, respectively.

First and second lead wires 70, 72, respectively, extend from the third lamp electrode 62. Although it is not illustrated in FIG. 2, it is to be understood that lead wires also extend from the first and second lamp electrodes 56, 58.

Two (2) of the three (3) ballast electrodes 36, 38, 40 are selectively energized to supply power to the corresponding lamp electrodes 56, 58, 62, thereby controlling a length of an arc extending through the tubes 42a, 42b, 42c, 42d and the passages 48a, 48b, 48c. More specifically, the length of the arc is controlled such that the arc either extends partially (e.g., through the first segment 66 or through the second segment 68) or fully (e.g., through the first segment 66 and the second segment 68) through the lamp assembly 14.

A first extended wire connection 84 is electrically connected between the first lamp electrode 56 and the first lead wire 70. A capacitor 86 is electrically connected in series along the first extended wire connection 84. The capacitor 86 acts as a capacitive impedance for limiting the current through the first extended wire connection 84 to less than approximately one (1) milliampere.

During use, the first, second, and third ballast electrodes 36, 38, 40, respectively, selectively deliver the controlled electrical power from the ballast unit 18 to two (2) of the first, second, and third lamp electrodes 56, 58, 62, respectively. More specifically, a user of the CFL system 10 selects one (1) of three (3) brightness levels, thereby energizing two (2) of the three (3) lamp electrodes 56, 58, 62 and defining a length of an arc created within the lamp assembly 14. Once electrical power is supplied to the two (2) selected lamp electrodes, a voltage potential is created between those lamp electrodes. It is to be appreciated that the brightness of the light output from the lamp assembly 14 is a function of the arc length. Furthermore, the color of the light output from the lamp assembly 14 is not affected by the length of the arc.

If it is desirable to produce the most amount of light from the CFL system 10, a voltage potential is created between the first and second lamp electrodes 56, 58, respectively. The first extended wire connection 84 also distributes the voltage to the first lead wire 70. Therefore, a voltage potential is also created between the first lead wire 70 and the second lamp electrode 58. The voltage potentials cause electrical fields to be created near the lamp electrodes 56, 58, 62 within the lamp assembly 14. It is to be understood that a breakdown path of the electrical fields is modified as a function of the position of the third lamp electrode 62.

The electrical fields cause current to flow within the tubes 42a, 42b, 42c, 42d and the passages 48a, 48b, 48c for breaking-down (i.e., ionizing) the inert gas. The first extended wire connection 84 provides an alternate path for the current to flow between the first lamp electrode 56 and the first lead wire 70. However, the capacitor 86 limits the current flowing between the first lamp electrode 56 and the first lead wire 70 via the first extended wire connection 84 to less than about one (1) milliampere.

When the power is initially supplied to the lamp electrodes 56, 58, the inert gas (e.g., Argon) and mercury vapor within the tubes 42a, 42b, 42c, 42d and passages 48a, 48b, 48c presents a high impedance to current created by electrical fields within the lamp assembly 14. However, less than about one (1) milliampere of current flows between the first lamp electrode 56 and the first lead wire 70 via the first extended wire connection 84.

The small amount of current at the first lead wire 70 causes the inert gas within the tubes 42c, 42b and the passage 48a to begin to ionize. After a threshold amount of the inert gas within the tubes 42c, 42b and the passage 48a is ionized, the first segment 66 of the lamp assembly 14, which includes the tubes 42c, 42b and the passage 48a, "starts" (i.e., the current flows freely through the first segment 66).

Once the first segment 66 of the lamp assembly 14 starts, the current flowing through the lamp tubes 42c, 42b and the passage 48a tends to flow from the first lead wire 70 to the first lamp electrode 56. The capacitor 86 limits the current flowing along the first extended wire connection 84 to less than about one (1) milliampere. Therefore, current above about one (1) milliampere is forced to flow between the first lead wire 70 and the first lamp electrode 56 via the second segment 68. Once a threshold amount of the inert gas within the tubes 42a, 42d and the passages 48b, 48c is ionized, the second segment 68 of the lamp assembly 14 starts.

After the first and second segments 66, 68, respectively, start, current flows freely through the lamp tubes 42a, 42b, 42c, 42d and the passages 48a, 48b, 48c.

As described above, the first extended wire connection 84 acts to distribute the voltage supplied by the ballast unit 18 more evenly along the breakdown path within the tubes 42a, 42b, 42c, 42d. Therefore, the voltage potential between the first and second lamp electrodes 56, 58, respectively, is extended to an additional point within the discharge space.

Consequently, the probability of the displacement current shorting between the electrodes 56, 58, even with a starting voltage of about 500 V rms, is greatly reduced. In other words, capacitive coupling does not occur between the lamp electrodes 56, 58, thereby allowing the CFL system 10 to start at a lower voltage.

If it is desirable to produce the least amount of light from the CFL system 10, a voltage potential is created between the second and third lamp electrodes 58, 62. The voltage potential causes electrical fields to be created near the second and third lamp electrodes 58, 62, respectively, within the lamp assembly 14.

The second and third lamp electrodes 58, 62 are not in close enough proximity to one another to create a capacitive breakdown path between the tube ends 42b1, 42c2 that include the second and third lamp electrodes 58, 62, respectively. Therefore, when a starting voltage is initially supplied to the second and third lamp electrodes 58, 62, respectively, a breakdown voltage path and a current are created within the lamp tubes 42b, 42c and the passage 48a. The voltage potential within the tubes 42b, 42c and the passage 48a breaks-down (i.e., ionizes) the inert gas and mercury within the first segment 66 of the lamp assembly 14. Once a threshold amount of the inert gas within the tubes 42b, 42c and the passage 48a is ionized, the first segment 66 of the lamp assembly 14 starts. Because no power is supplied to the first lamp electrode 56, no current flows within the second segment 68 of the lamp assembly 14. Therefore, the second segment 68 of the lamp assembly 14 does not start.

If it is desirable to produce the intermediate amount of light from the CFL system 10, a voltage potential is created between the first and third lamp electrodes 56, 62. The voltage potential causes electrical fields to be created near the first and third lamp electrodes 56, 62, respectively, within the lamp assembly 14.

The first and third lamp electrodes 56, 62 are not in close enough proximity to one another to create a capacitive breakdown path between the tube ends 42a2, 42c2 that include the first and third lamp electrodes 56, 62, respectively. Therefore, when a starting voltage is initially supplied to the first and third lamp electrodes 56, 62, respectively, a breakdown voltage path and a current are created within the lamp tubes 42a, 42d and the passages 48c, 48b. The voltage potential within the tubes 42a, 42d and the passages 48c, 48b breaks-down (i.e., ionizes) the inert gas and mercury within the second segment 68. Once a threshold amount of the inert gas within the tubes 42a, 42d and the passages 48b, 48c is ionized, the second segment 68 of the lamp assembly 14 starts. Because no power is supplied to the second lamp electrode 58, no current flows within the first segment 66 of the lamp assembly 14. Therefore, the first segment 66 of the lamp assembly 14 does not start.

Figure 3:
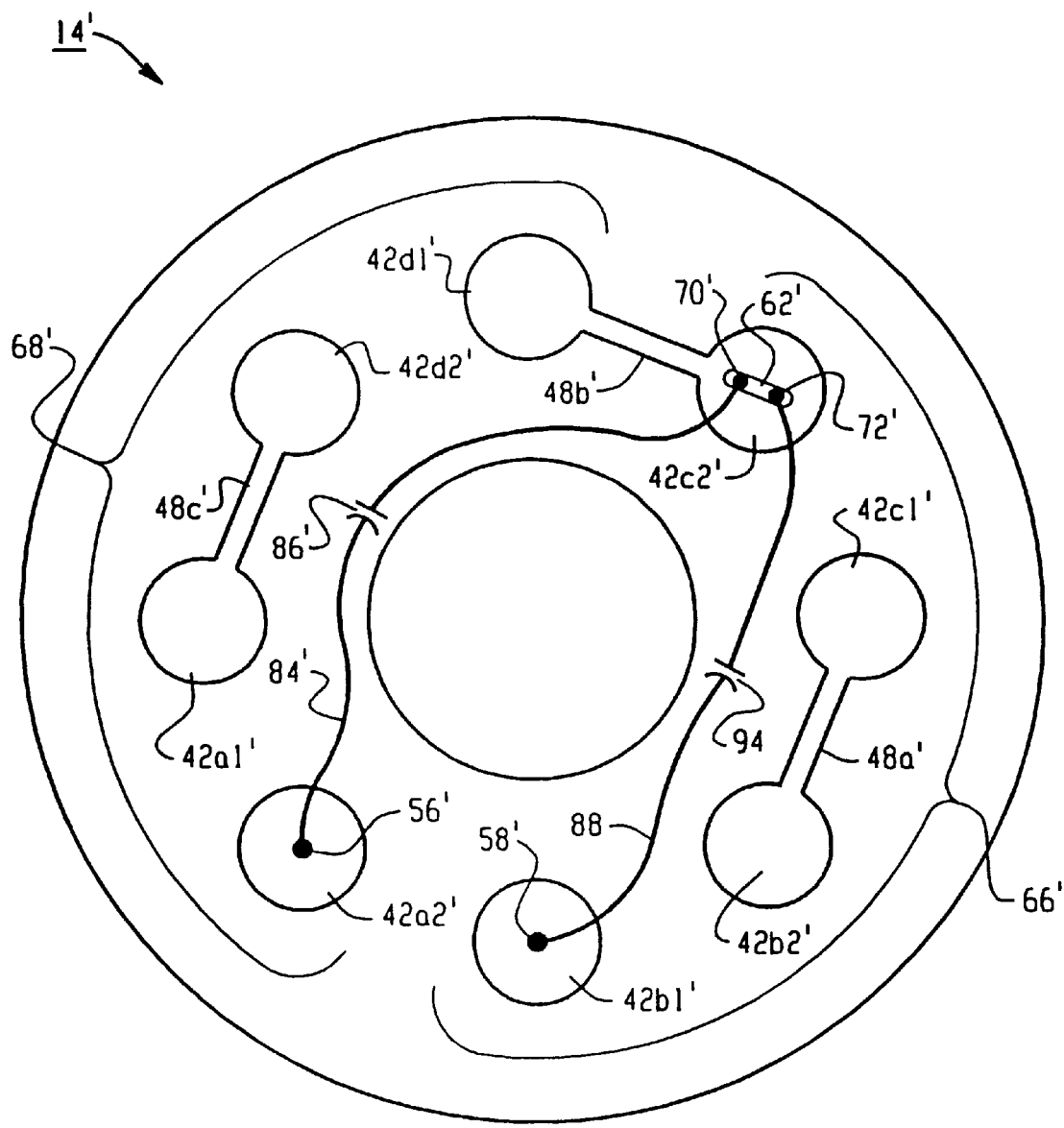
FIG. 3 illustrates a cross-sectional bottom view of the integral CFL assembly in a second embodiment of the invention.

FIG. 3 illustrates a lamp assembly in a second embodiment of the present invention. For ease of understanding this embodiment, like components are designated by like numerals with a primed (') suffix and new components are designated by new numerals.

FIG. 3 illustrates, in addition to a first extended wire connection 84' including a first capacitor 86', a second extended wire connection 88 including a second capacitor 94 electrically connected between a second lamp electrode 58' and a second lead wire 72'.

As in the first embodiment, the first and second capacitors 86', 94 act as capacitive impedances for limiting currents through the first and second extended wire connections 84', 88 to less than approximately one (1) milliampere. Although very little current flows through either of the extended wire connections 84', 88, the lead wires 70', 72' at the end of the extended wire connections 84', 88 add additional electrical field points along the path within the lamp assembly 14'. In this manner, the breakdown path of the electrical field is modified.

If it is desirable to produce the most amount of light from the CFL system 10' illustrated in FIG. 3, a voltage potential is created between the first and second lamp electrodes 56', 58'. In addition to a voltage potential between the first lead wire 70' and the second lamp electrode 58', the second extended wire connection 88 creates a voltage potential between the second lead wire 72' and the first lamp electrode 56'. The voltage potentials cause electrical fields to be created within the lamp assembly 14' near the lamp electrodes 56', 58', 62'. As in the first embodiment, a breakdown path of the electrical fields is modified as a function of the position of the third lamp electrode 62'.

When electrical power is first applied to the first and second lamp electrodes 56', 58', respectively, less than about one (1) milliampere of current flows between the first lamp electrode 56' and the first lead wire 70' (via the first extended wire connection 84') and also between the second lamp electrode 58' and the second lead wire 72' (via the second extended wire connection 88).

The voltage potentials cause the inert gas within the first and second segments 66', 68', respectively, to begin to ionize. After a threshold amount of the inert gas ionizes, the first and second segments 66', 68', respectively, "start". Once the first and second segments 66', 68', respectively, start, the capacitors 86', 94 force all but about one (1) milliampere of the current to flow within the lamp tubes 42a', 42b', 42c', 42d' and the passages 48a', 48b', 48c'.

If it is desirable to produce the least amount of light from the CFL system 10' illustrated in FIG. 3, a voltage potential is created between the second and third lamp electrodes 58', 62'. Electrical fields are created near the second and third lamp electrodes 58', 62', respectively, within the lamp assembly 14'.

When a starting voltage is initially supplied to the second and third lamp electrodes 58', 62', respectively, the electromagnetic fields create a breakdown voltage path and a current within the lamp tubes 42b', 42c' and the passage 48a'. The second capacitor 94 limits the current flowing along the second extended wire connection 88 to less than about one (1) milliampere.

Once a threshold amount of the inert gas within the tubes 42b', 42c' and the passage 48a' is ionized, the first segment 66' of the lamp assembly 14 starts. Because no power is supplied to the first lamp electrode 56', no current flows within the second segment 681 of the lamp assembly 14'. Therefore, the second segment 68' of the lamp assembly 14' does not start.

If it is desirable to produce the intermediate amount of light from the CFL system 10' illustrated in FIG. 3, a voltage potential is created between the first and third lamp electrodes 56', 62'. In this case, the startup and operation of the CFL system 10' is similar to the corresponding startup and operation of the CFL system 10 illustrated in FIG. 2.

The preferred embodiment discloses the first and second extended wire connections, along with the first and/or second capacitors electrically connected in series along the extended wire connections, utilized within an integral compact fluorescent lamp system. However, it is also contemplated that the first and second extended wire connections, along with the first and/or second capacitors, also be utilized within a plug-in type lamp assembly.

The invention has been described with reference to several embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A starting circuit for a three-way fluorescent lamp system, comprising:

a ballast unit for controlling electrical power received from an external power source;

a sealed lamp unit, including at least one gas, secured to the ballast unit;

first and second lamp electrodes extending into a discharge space of the sealed lamp unit at respective points of the sealed lamp unit;

a third lamp electrode, extending into the discharge space at a point between the first and second lamp electrodes along the sealed lamp unit, electrically connected to the ballast unit, two of the three lamp electrodes being selectively energized for achieving a desired light output level, a color of the light output being independent of the output level, and a breakdown voltage path within the sealed lamp unit being modified as a function of a position of the third lamp electrode;

a first extended wire connection electrically connected between the first and third lamp electrodes; and a first capacitor, electrically connected along the first extended wire connection.

2. The starting circuit as set forth in claim 1, wherein the third lamp electrode divides the sealed lamp unit into first and second sections having unequal lengths.

3. The starting circuit as set forth in claim 2, wherein:

a highest brightness level is achieved when the first and second lamp electrodes are energized;

a lowest brightness level is achieved when the first and third lamp electrodes are energized; and an intermediate brightness level is achieved when the second and third lamp electrodes are energized.

4. The starting circuit as set forth in claim 3, wherein the lowest and intermediate brightness levels are functions of the respective lengths of the first and second sections.

5. The starting circuit as set forth in claim 2, wherein:

the sealed lamp unit is multi-segmented and substantially circular; and the first and second lamp electrodes are located in adjacent segments.

6. The starting circuit as set forth in claim 5, wherein the sealed lamp includes eight segments.

7. The starting circuit as set forth in claim 5, wherein one of the segments includes an amalgam ball pellet, the third lamp electrode extending into the segment including the amalgam ball pellet.

8. The starting circuit as set forth in claim 1, further including:

a second extended wire connection electrically connected between the second and third lamp electrodes; and a second capacitor, electrically connected along the second extended wire connection.

9. A method for starting a three-way compact fluorescent lamp system, comprising:

receiving electrical power from an external source into a ballast unit;

controlling the electrical power received into the ballast unit;

selectively supplying the controlled power from the ballast unit to two (2) of first, second, and third lamp electrodes extending into a discharge space of a sealed lamp unit, the first and third lamp electrodes being electrically connected via a first extended wire connection including a first capacitor for limiting a current flow along the first extended wire connection, one of three brightness levels of light being output from the sealed lamp unit as a function of the two (2) lamp electrodes selected, a color of the light being independent of the brightness level;

creating electrical fields in at least at the two (2) selected electrodes within the sealed lamp unit from the controlled power; and starting at least a portion of the sealed lamp unit by passing current between the two (2) selected lamp electrodes, a breakdown voltage path within the sealed lamp unit being determined as a function of a position of the third lamp electrode.

10. The method for starting a three-way compact fluorescent lamp system as set forth in claim 9, wherein, for achieving the highest level brightness level:

the step of selectively supplying the controlled power includes:
supplying the controlled power to the first and second lamp electrodes, the first extended wire connection creating a voltage potential between the second and third lamp electrodes; and
the step of starting at least a portion of the sealed lamp unit includes:
starting a first portion of the sealed lamp unit between the second and third lamp electrodes; and
starting a second portion of the sealed lamp unit between the first and third lamp electrodes.

11. The method for starting a three-way compact fluorescent lamp system as set forth in claim 10, wherein:
the step of starting the first portion includes:
passing the current limited by the first capacitor between the first and third lamp electrodes; and
passing the current between the third and second lamp electrodes; and
the step of starting the second portion includes:
passing the current between the second and third lamp electrodes; and
passing the current between the third and first lamp electrodes.

12. The method for starting a three-way compact fluorescent lamp system as set forth in claim 10, wherein, for achieving the lowest brightness level:
the step of selectively supplying the controlled power includes:
supplying the controlled power to the second and third lamp electrodes, a length of a first portion of the sealed lamp unit, located between the second and third lamp electrodes, being shorter than a length of a second portion of the sealed lamp unit, located between the first and third lamp electrodes; and
the step of starting at least a portion of the sealed lamp unit includes:
starting the first portion of the sealed lamp unit.

13. The method for starting a three-way compact fluorescent lamp system as set forth in claim 12, wherein, for achieving the intermediate brightness level:
the step of selectively supplying the controlled power includes:
supplying the controlled power to the first and third lamp electrodes; and
the step of starting at least a portion of the sealed lamp unit includes:
starting the second portion of the sealed lamp unit.

14. The method for starting a three-way compact fluorescent lamp system as set forth in claim 13, the second and third lamp electrodes being electrically connected via a second extended wire connection including a second capacitor for limiting a current flow along the second extended wire connection:
wherein, for achieving the highest brightness level:
the step of starting the first portion includes:
passing the current limited by the first capacitor between the first lamp electrode and the third lamp electrode;
passing the current between the third lamp electrode and the second lamp electrode;
the step of starting the second portion includes:
passing the current limited by the second capacitor between the second lamp electrode and the third lamp electrode; and
passing the current between the third lamp electrode and the first lamp electrode.

15. The method for starting a three-way compact fluorescent lamp system as set forth in claim 14:
wherein, for achieving the lowest brightness level:
the step of starting the first portion includes:
passing the current between the second and third lamp electrodes via the sealed lamp unit and the second capacitor;
wherein, for achieving the intermediate brightness level:
the step of starting the second portion includes:
passing the current between the first and third lamp electrodes via the sealed lamp unit and the first capacitor.

16. A sealed lamp unit for a three-way fluorescent lamp system, comprising:
first and second lamp electrodes located at respective end points of, and extending into, a discharge space of the sealed lamp unit, the sealed lamp unit including at least one gas which breaks-down when an electrical voltage potential is created within the sealed lamp unit;
a third lamp electrode located between the first and second lamp electrodes and extending into the discharge space of the sealed lamp unit, a brightness level of light output from the sealed lamp unit being a function of energizing selected electrodes, a color of the light being independent of the brightness level;
a first extended wire connection electrically connected between the first and second lamp electrodes; and
a first capacitive impedance, electrically connected in series along the first extended wire connection, for limiting a current flow through the first extended wire connection, a breakdown voltage path within the sealed lamp unit being modified as a function of a position of the third lamp electrode.

17. The sealed lamp unit as set forth in claim 16, wherein:
the sealed lamp unit is substantially circular and includes a plurality of segments;
the first and second lamp electrodes are located in first and second segments of the sealed lamp unit, the first and second segments being adjacent to one another; and
the third lamp electrode extends into a third segment of the sealed lamp unit.

18. The sealed lamp unit as set forth in claim 17, wherein the sealed lamp unit includes eight segments.

19. The sealed lamp unit as set forth in claim 16, further including:
a second extended wire connection, electrically connected between the second and third lamp electrodes; and
a second capacitive impedance, electrically connected in series along the second extended wire connection, for limiting a current flow through the second extended wire connection.

* * * * *